United States Patent
Hayduk

(10) Patent No.: US 6,412,756 B1
(45) Date of Patent: Jul. 2, 2002

(54) GASTIGHT BALL VALVE FOR GRANULES

(75) Inventor: Alexander Hayduk, Gammelsdorf (DE)

(73) Assignee: Wacker Chemie GmbH, Müchen (DE)

( * ) Notice: Subject to any disclaimer, the term of this patent is extended or adjusted under 35 U.S.C. 154(b) by 0 days.

(21) Appl. No.: 09/685,677

(22) Filed: Oct. 10, 2000

(30) Foreign Application Priority Data

Oct. 14, 1999 (DE) .......................................... 199 49 577

(51) Int. Cl.$^7$ ................................................ F16K 5/06
(52) U.S. Cl. ............................. 251/315.1; 251/315.16
(58) Field of Search ....................... 251/315.16, 315.01, 251/315.1

(56) References Cited

U.S. PATENT DOCUMENTS

| | | | | |
|---|---|---|---|---|
| 3,220,694 A | * | 11/1965 | Eschbaugh | 251/316 X |
| 3,404,864 A | * | 10/1968 | Reddy | 251/314 X |
| 3,591,129 A | * | 7/1971 | Hulsey | 251/315.16 X |
| 3,795,384 A | * | 3/1974 | Reddy | 251/315.08 X |
| 4,130,268 A | * | 12/1978 | Kojima et al. | 251/298 |
| 5,205,533 A | * | 4/1993 | Berchem | 251/315.16 X |
| 5,205,998 A | | 4/1993 | Boone et al. | |
| 5,551,467 A | * | 9/1996 | Booth et al. | 251/315.16 X |

FOREIGN PATENT DOCUMENTS

DE 2607686 9/1977

OTHER PUBLICATIONS

English Derwent Abstract corresp. to DE 2607686.

* cited by examiner

Primary Examiner—William C. Doerrler
Assistant Examiner—John Bastianelli
(74) Attorney, Agent, or Firm—Collard & Roe, P.C.

(57) ABSTRACT

A gastight shut-off device (1) which can be fitted between a supply pipeline (2) and a discharge pipeline (3), in the form of a ball valve, includes a housing (4), a housing flow passage with an inlet section (5) and an outlet section (6), a shut-off ball (7) with a shut-off ball flow passage (8), the shut-off ball (7) being mounted in the housing (4), if appropriate by means of two sealing rings (9, 10), and an actuating drive (11) for the shut-off ball (7); and inlet section (5) is designed in such a manner that it reaches into the shut-off ball flow passage (8), which is designed in such a manner that, in the event of the ball valve closing through rotation of the shut-off ball (7), that part of the inlet section (5) which reaches into the shut-off ball flow passage (8) is accommodated in a slot in the shut-off ball.

9 Claims, 5 Drawing Sheets

GASTIGHT BALL VALVE FOR GRANULES

BACKGROUND OF THE INVENTION

1. Field of the Invention

The present invention relates to a gastight ball valve for granules.

2. The Prior Art

For handling a polysilicon material which is deposited in a fluidized bed and is in the form of granules with grain sizes of approximately 200 μm to 3 mm, shut-off devices are required to control the flow of granules. Pipelines which are lined with materials which prevent the silicon from becoming contaminated, such as for example quartz glass, silicon or ceramic, are used to remove the polysilicon granules from the fluidized-bed reactor. The flow of granules in vertical conveying sections is blocked by means of devices which are likewise lined with the abovementioned materials.

A device of this type is described, for example, in U.S. Pat. No. 5,205,998. These shut-off devices are generally insufficiently gastight, so that it is necessary to use combinations of the abovementioned shut-off devices and downstream gastight devices. However, the gastight devices must under no circumstances come into contact with solids, i.e. granules or other bulk materials, since otherwise the sealing surfaces are damaged and gas-tightness can no longer be ensured.

SUMMARY OF THE INVENTION

It is an object of the present invention to simplify the conveying of granular materials, such as for example granular polysilicon which has been deposited in a fluidized bed, and to provide a shut-off device which is able to interrupt a flow of granules and ensures gas-tightness between a supply pipeline and a discharge pipeline. Moreover, it should be easy to manufacture the shut-off device in any desired size.

The above object is achieved according to the present invention by means of a shut-off device 1 which can be fitted between a supply pipeline 2 and a discharge pipeline 3, in the form of a ball valve, comprising a housing 4, a housing flow passage with an inlet section 5 and an outlet section 6, a shut-off ball 7 with a shut-off ball flow passage 8, the shut-off ball 7 being mounted in the housing 4, if appropriate by means of two sealing rings 9, 10, and an actuating drive 11 for the shut-off ball 7, wherein the inlet section 5 is designed in such a manner that it reaches into the shut-off ball flow passage 8, which is designed in such a manner that, in the event of the ball valve closing through rotation of the shut-off ball 7, that part of the inlet section 5 which reaches into the shut-off ball flow passage 8 is accommodated in a slot in the shut-off ball.

In the shut-off device according to the invention, the upper seal 9 no longer has to fulfil a sealing function. It is used to fix the shut-off ball 7 in the interior of the housing 4. In principle, it is possible for the shut-off ball 7 to be fixed in the interior of the housing 4 by the housing itself or by the inert lining 14 without a seal. The sealing rings are therefore optional.

The shut-off ball 7 is preferably slotted at a 90° angle. Hence that part of the inlet section 5 which reaches into the shut-off ball flow passage 8 can remain rigidly inside the ball body during the rotation of the ball.

Furthermore, the shut-off ball flow passage 8 is preferably designed in such a way that, in the event of wear to the ball valve through rotation of the shut-off ball 7, initially a cone of poured granular material in the shut-off ball flow passage 8 interrupts the flow of granules. This occurs without producing gas-tightness between inlet section 5 and outlet section 6. Thus the gas-tightness between inlet section 5 and outlet section 6 is only produced when the shut-off ball 7 rotates further.

In this case, the shut-off ball flow passage 8 is preferably designed in such a way that the flow of granules is shut off with the smallest possible rotation angle of the shut-off ball 7. At the same time the seal 10 covers the shut-off ball flow passage 8 and thus covers the gas flow in the direction of the discharge pipeline 3 as late as possible. This reliably prevents the seal 10 from being damaged by the granular material.

This is preferably achieved by selecting a suitable diameter of the shut-off ball flow passage. For this purpose, the shut-off ball flow passage diameter is selected to be as small as possible, in order to obtain the maximum possible distance to the cone of poured material, but large enough to allow unimpeded flow of bulk material. Furthermore, for this purpose chamfers 12, optionally 13 are preferably present in the shut-off ball flow passage 8 below the inlet section 5, and optionally at the exit into the outlet section 6.

The chamfer 12 in the shut-off ball flow passage 8 below the inlet section 5 is designed at an angle which is adapted to the bulk material. In this case, the angle is to be such that even with a small rotation angle of the ball the chamfer forms a 180° angle with the cone of poured material and the flow of bulk material is interrupted. On the other hand it is impossible for any bulk material to become jammed in the gap between inlet cross section and the ball.

If the shut-off device is to be used, for example, for handling silicon granules, the chamfer is designed in such a manner that, for a rotation angle of the ball of 15°, it forms an angle of 30° with the surface of the silicon granules, since silicon granules form a poured cone with a slope of approximately 30°. As soon as the granules form a cone with an angle of 30° to the horizontal, the flow of granules stops. This is achieved with a very high level of reliability by the chamfer 12 which is preferably present.

The chamfer 13 at the exit into the outlet section 6 and the position of the seal 10 are preferably adapted to one another in such a manner that the rotation angle of the ball between closing-off the flow of granules and closing off the flow of gas is as large as possible.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
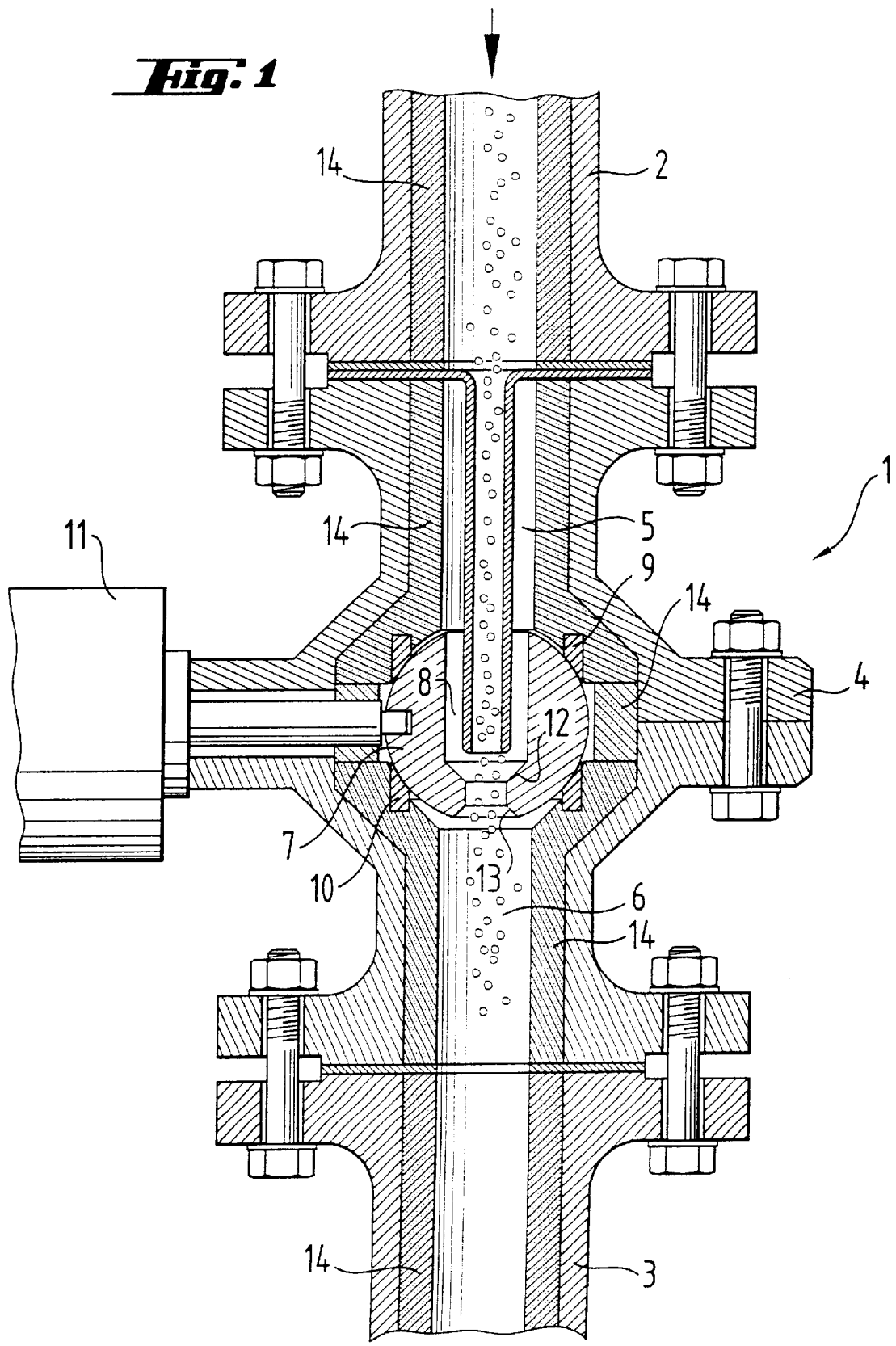
FIG. 1 shows the open shut-off device according to the present invention.

Turning now in detail to the drawings, FIG. 1 shows the open shut-off device 1, according to the invention.

Figure 2:
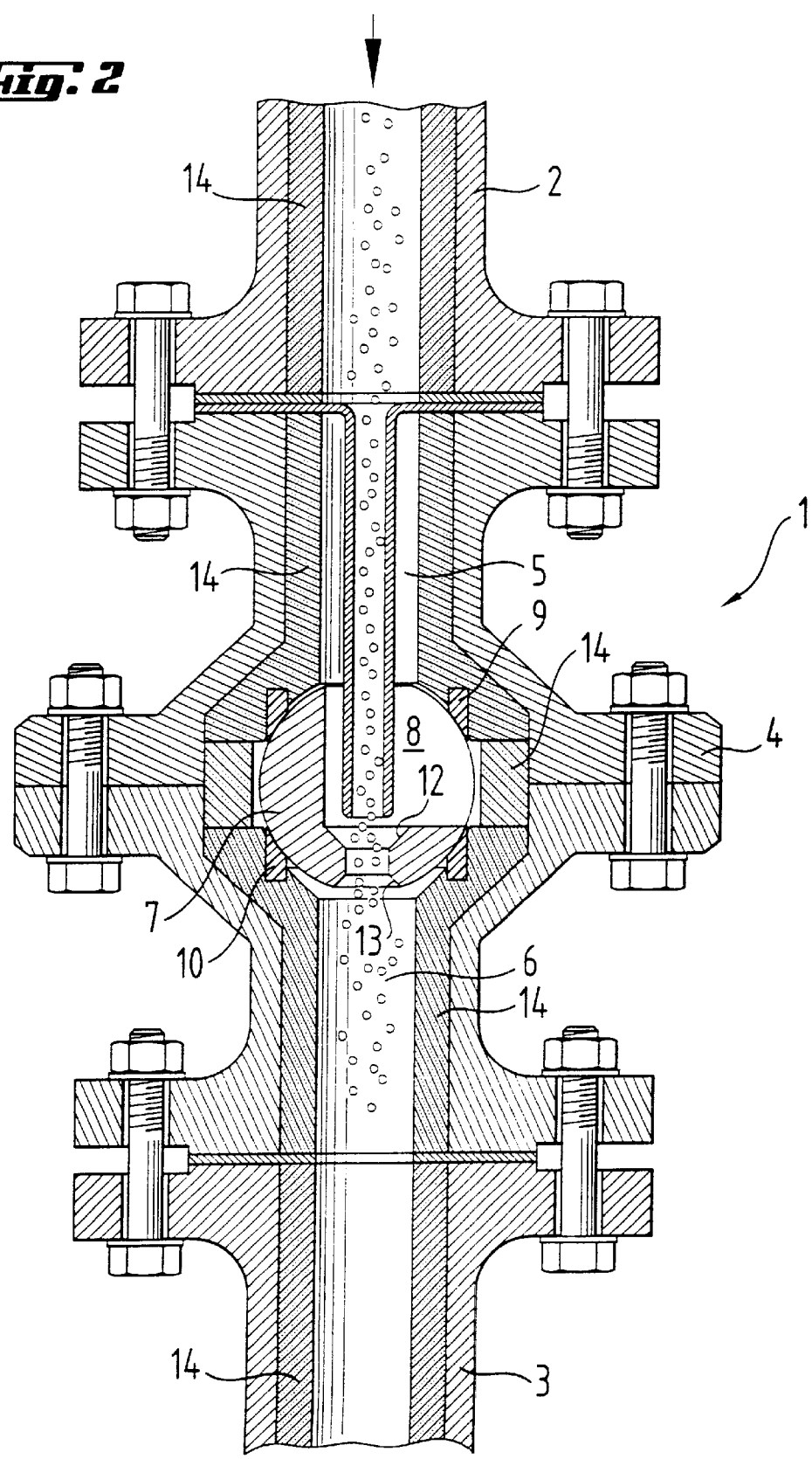
FIG. 2 shows the shut-off device of FIG. 1 after it has been rotated through 90° in the direction of the longitudinal axis.

FIG. 2 shows the shut-off device of FIG. 1 after it has been rotated through 90° in the direction of the longitudinal axis.

Figure 3:
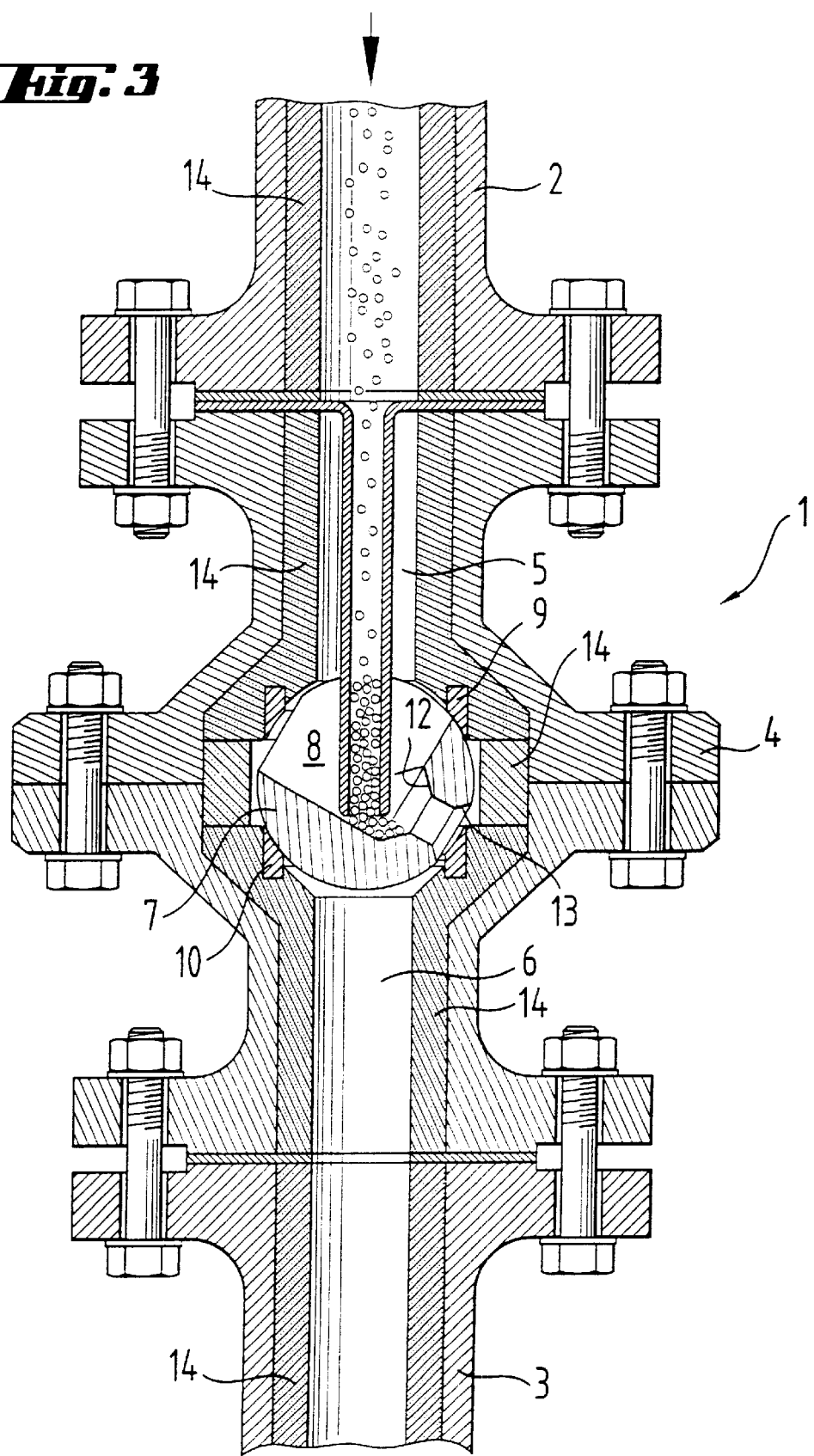
FIG. 3 shows the shut-off device of FIG. 1 which is closed to bulk material.

FIG. 3 shows the shut-off device which is closed to bulk material. The granules form a cone with its poured angle (in the present case approximately 30°) to the horizontal. Because of the chamfer 12 in the shut-off ball passage 8 below the inlet section 5, the granules can no longer flow away toward the side. Thus, the flow of granules has come to a standstill. Due to the chamfer 13, the seal 10 (annular seal) is not yet fully in engagement; the gas can continue to flow.

Figure 4:
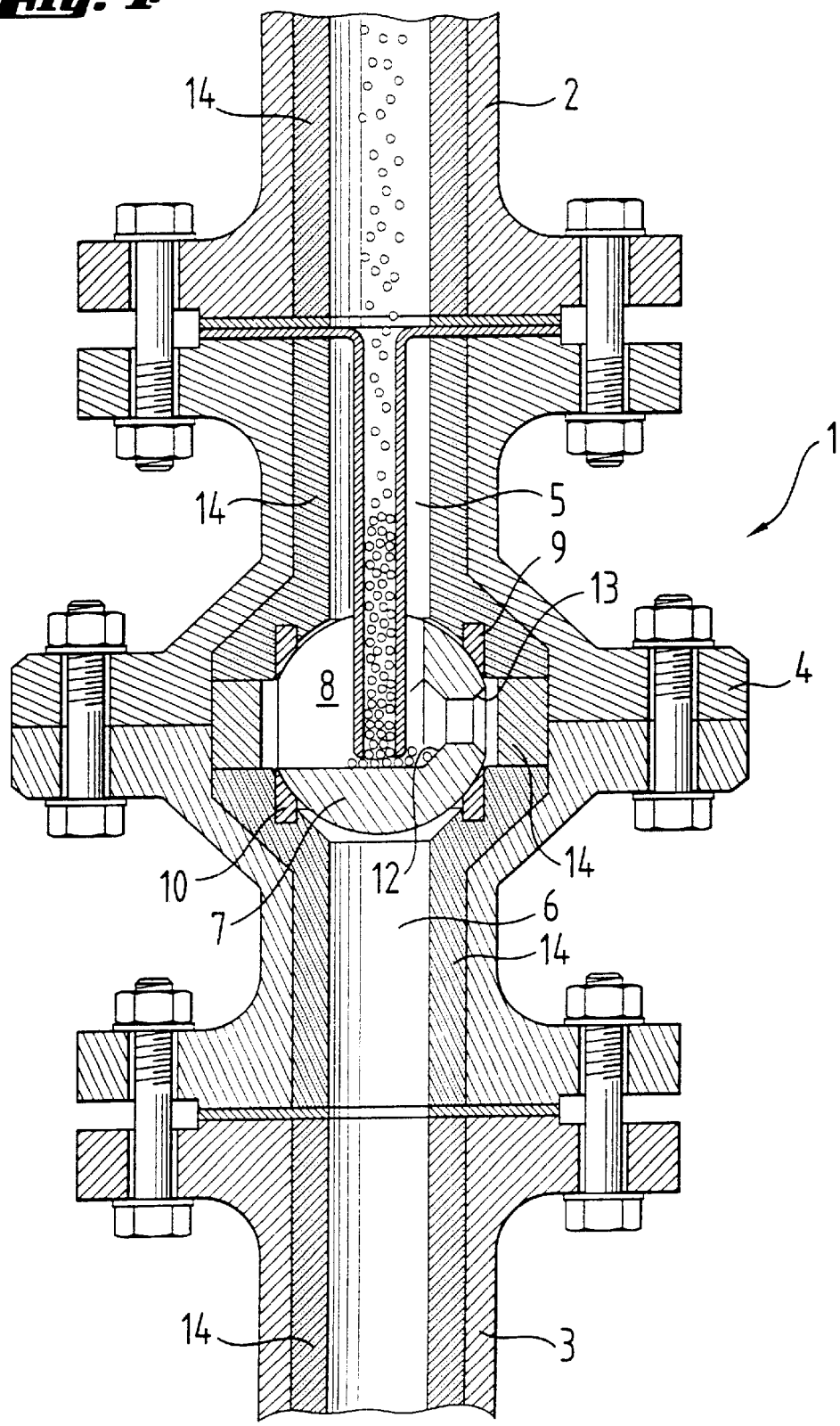
FIG. 4 shows the shut-off device of FIG. 1 which has been closed in a gastight manner.

FIG. 4 shows the shut-off device which has been closed in a gastight manner. The seal 10 is fully in engagement. The valve is gastight. In this figure too, the cone of poured material can still be seen.

Figure 5:
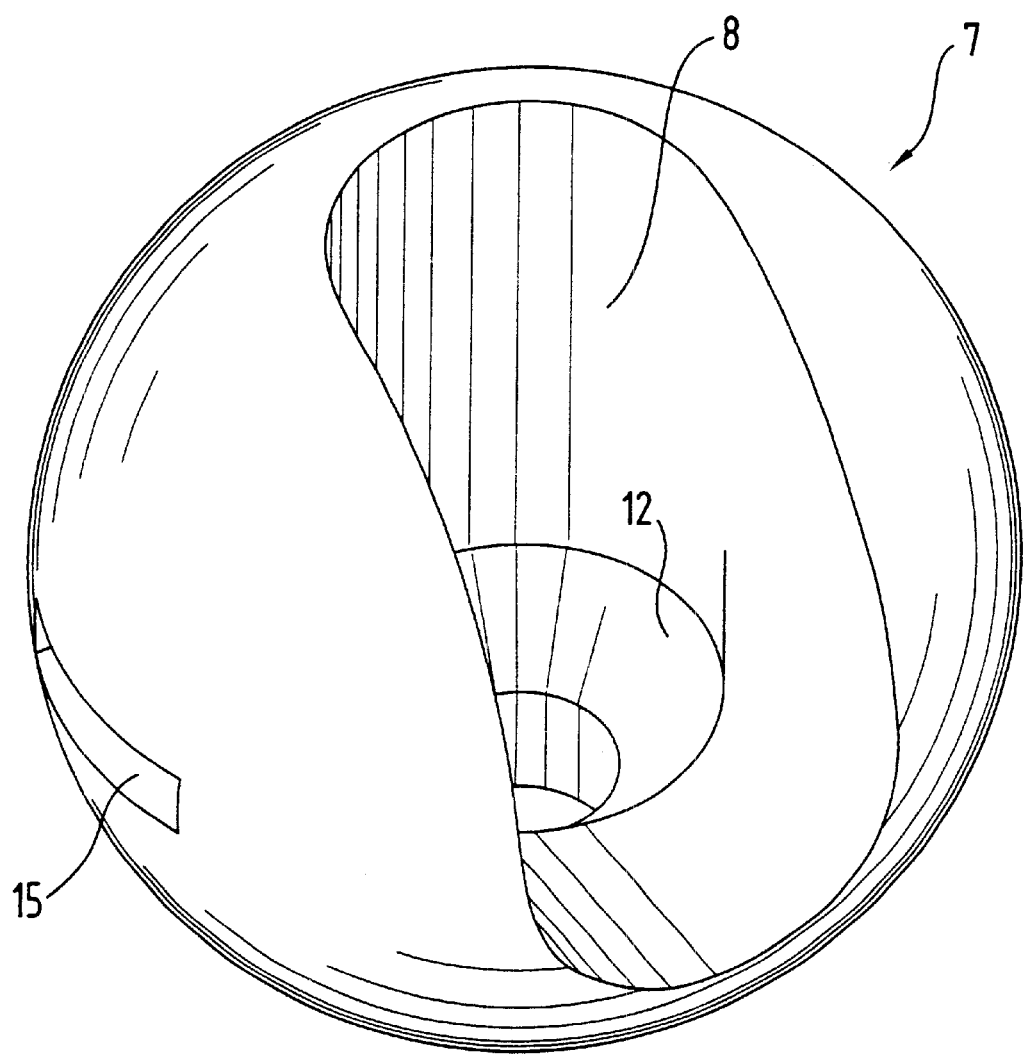
FIG. 5 shows an embodiment of the shut-off ball of FIG. 1 which is slotted over a 90° angle.

FIG. 5 shows an embodiment of the shut-off ball 7 which is slotted over a 90° angle. At the side, it is possible to see a standard cutout 15 for the usual attachment of the actuating drive 11. It is also possible to see the chamfer 12 in the shut-off ball flow passage 8.

The shut-off device according to the invention combines the materials property of the specific pouring angle of a bulk material, such as for example silicon granules, with the known technology of a ball valve. The special shape of the shut-off ball meant that when the device is closed, firstly the flow of granules is interrupted by means of a cone of poured material, and the flow of gas is only closed off in a gastight manner in the event of further rotation.

A ball valve according to the invention can be produced by suitably machining the shut-off ball from a standard commercially available ball valve. That part of the inlet section 5 which has been extended according to the invention and reaches into the shut-off ball flow passage can be produced, for example, by attaching a tube of suitable length in the interior of the inlet section of a standard commercially available ball valve. This tube may equally well be attached to the top of the housing 4 or to the supply pipeline 2. Consequently, the ball valve according to the invention is easy to produce from a standard ball valve. The ball valve according to the invention is not susceptible to faults, since it has only one moving part. In addition, using this valve obviates the need for a second gastight device.

If necessary, the housing 4 of the ball valve and also the supply pipeline 2 and the discharge pipeline 3 may be provided with inert lining parts 14.

Thus, when used as a shut-off device for controlling the flow of polysilicon granules out of the fluidized-bed reactor, the shut-off device according to the invention preferably consists of quartz glass, pure monosilicon or polysilicon or ceramic material, such as for example zirconium oxide. It is also possible if the shut-off device is lined with one of these materials in those areas which come into contact with the silicon granules, in order to prevent contamination to the high-purity silicon granules.

Other materials, for example metals (e.g. stainless steel), are also suitable for producing or lining the ball valve according to the invention for applications with less stringent purity requirements, e.g. for different bulk materials.

The known sealing materials, such as for example PTFE, can be used as soft seals for the seals 9, 10. However, other seals, such as metal seals, are also suitable. Here, "PTFE" means polytetrafluoroethylene.

The shut-off device according to the invention is suitable for handling high-purity silicon granules and for handling ferrosilicon or for handling any type of bulk materials and granules for which a gastight closure is required for the pipeline in which the material is conveyed.

The present invention will now be further illustrated by the following examples which are used to explain the invention, but are not deemed to be limitative of the present invention, in any manner thereof.

EXAMPLE

Leak Tests in Accordance with DIN 3230 Part 3

A device according to the invention and three commercially available ball valves were subjected to a leak test in accordance with DIN 3230 Part 3. For this purpose, the device in question is exposed to a water pressure which corresponds to the nominal pressure of the device, in these cases 16 bar.

The following classifications apply for devices up to nominal width 40 (nominal width classification in accordance with EN ISO 6708):

Test time 25 min, leak rate 1 means "sealed", 0 drops per minute;

leak rate 2 means "wet", 1 drop per minute;

leak rate 3 means "dropping", 5 drops per minute (1 drop=100 mm$^3$)

The test results are set forth in Table 1.

TABLE 1

| Device | Number of switching operations under load from granules | Leak rate |
| --- | --- | --- |
| Ball valve according to the invention made from stainless steel with PTFE seal | 500 | 1 |
| Ball valve made from silicon | 200 | 3 |
| Ball valve made from ZrO$_2$ | 200 | 2 |
| Conventional ball valve made from stainless steel with PTFE seal | 5 | Defective |

In comparative examples in lines 2 and 3, ball valves from various manufacturers and made from a variety of materials were used. These expensive ball valves have the feature that the balls are ground into a seat made from the same material as the ball, i.e. they do not have a soft seal. Normally, this grinding ensures that the valves are sealed (leak rate 1–2). The indicated number of switching operations carried out with the valves exposed to silicon granules led to the ground surfaces being damaged to such an extent that the leak rates increased.

In line 1, a stainless steel ball valve which had been modified according to the invention was used and was tested under the same conditions as the ball valves in lines 2 to 4. Due to the particular design of the shut-off ball together with the extended inlet section, the seal in the ball valve was protected and the gas-tightness of the stainless-steel ball valve was maintained. Consequently, even after more than twice as many switching operations under load from granules, the ball valve according to the invention presented better gas-tightness than the comparative ball valves in lines 2 and 3 of Table 1, which were made from more stable materials, are more complex and more expensive.

In the case of the ball valve tested in line 4, which like the ball valve according to the invention consists of stainless steel with a PTFE soft seal, the seal was damaged to such an extent that the ball valve was no longer able to fulfil its role after an extremely short time.

Accordingly, while a few embodiments of the present invention have been shown and described, it is to be understood that many changes and modifications may be made thereunto without departing from the spirit and scope of the invention as defined in the appended claims.

What is claimed is:

1. A shut-off device (1) which can be fitted between a supply pipeline (2) and a discharge pipeline (3), in the form of a ball valve, comprising a housing (4);

a housing flow passage with an inlet section (5) and an outlet section (6);

a shut-off ball (7) with a shut-off ball flow passage (8), the shut-off ball (7) being mounted in the housing (4), by means of two sealing rings (9, 10);

an actuating drive (11) for the shut-off ball (7);

said inlet section (5) reaching into the shut-off ball flow passage (8), which is designed in such a manner that, in the event of the ball valve closing through rotation of the shut-off ball (7), that part of the inlet section (5) which reaches into the shut-off ball flow passage (8) is accommodated in a slot in the shut-off ball;

wherein the shut-off ball flow passage diameter is as small as possible, in order to obtain a maximum possible distance to a cone of poured material, but large enough to allow unimpeded flow of bulk material; and chamfer (12) and chamfer (13), are present in the shut-off ball flow passage (8) below the inlet section (5), and at an exit into the outlet section (6).

2. The shut-off device as claimed in claim 1, wherein the shut-off ball (7) is slotted at a 90° angle, so that part of the inlet section (5) which reaches into the shut-off ball flow passage (8) remains rigidly inside the ball body during the rotation of the ball.

3. The shut-off device as claimed in claim 1, wherein the shut-off ball flow passage (8) is constructed such that due to wear to the ball valve through rotation of the shut-off ball (7), initially a cone of poured granular material in the shut-off ball flow passage (8) interrupts a flow of granules without producing gas-tightness between inlet section (5) and outlet section (6), and a gas-tightness between inlet section (5) and outlet section (6) is only produced when the shut-off ball (7) rotates further.

4. The shut-off device as claimed in claim 1, wherein the shut-off ball flow passage (8) is constructed such that a flow of granules is shut off with a smallest possible rotation angle of the shut-off ball (7), while the seal (10) covers the shut-off ball flow passage (8) and thus covers a gas flow in a direction of the discharge pipeline (3) as late as possible.

5. The shut-off device as claimed in claim 4, wherein the chamfer (12) in the shut-off ball flow passage (8) below the inlet section (5) is at an angle which is adapted to the bulk material.

6. The shut-off device as claimed in claim 4, wherein the chamfer (13) is present at an exit into the outlet section (6) and a position of the seal (10) are located each to the other in such a manner that a rotation angle of the ball between closing off a flow of granules and closing off a flow of gas is as large as possible.

7. The shut-off device as claimed in claim 1, wherein that part of the inlet section (5) which reaches into the shut-off ball flow passage (8) is formed by attaching a tube of suitable length into an interior of an inlet section of a standard commercially available ball valve.

8. The shut-off device as claimed in claim 1, further comprising inert lining parts (14) for the housing (4) of the ball valve;

inert lining parts (14) for the supply pipeline (2); and inert lining parts (14) for the discharge pipeline (3).

9. The shut-off device as claimed in claim 3, wherein the granular material is selected from the group consisting of high-purity silicon granules, ferrosilicon granules, and bulk material granules.

* * * * *